United States Patent [19]

Reisman

[11] Patent Number: 5,450,953
[45] Date of Patent: Sep. 19, 1995

[54] COMPACT DISC PACKAGE WITH SLIDE TAB

[76] Inventor: James Reisman, 247 Waverly Pl., New York, N.Y. 10014

[21] Appl. No.: 47,868

[22] Filed: Apr. 15, 1993

[51] Int. Cl.⁶ .................. B65D 85/57; B65B 11/00; B31B 1/60
[52] U.S. Cl. .................. 206/310; 53/410; 53/442; 53/449; 53/462; 206/312; 206/804; 493/84; 493/114
[58] Field of Search .................. 493/84, 114, 115, 86, 493/128, 151, 162, 183; 53/410, 442, 449, 462; 206/309, 310, 312, 313, 303, 493, 804

[56] References Cited

U.S. PATENT DOCUMENTS

| | | |
|---|---|---|
| 2,777,574 | 1/1957 | Brody . |
| 2,866,541 | 12/1958 | Ravis . |
| 3,005,544 | 10/1961 | Chaplin .................. 206/313 |
| 3,229,811 | 1/1966 | Studwell .................. 206/303 X |
| 3,233,728 | 2/1966 | Johnson et al. .................. 206/493 X |
| 3,906,702 | 9/1975 | Yeno .................. 206/312 X |
| 4,339,034 | 7/1982 | Panveno .................. 206/313 |
| 4,411,360 | 10/1983 | Gardineer, Jr. et al. . |
| 4,473,153 | 9/1984 | Colangelo . |
| 4,562,504 | 12/1985 | Miklos . |
| 4,605,125 | 8/1986 | James . |
| 4,640,413 | 2/1987 | Kaplan et al. . |
| 4,687,101 | 8/1987 | Barker, Sr. et al. . |
| 4,709,812 | 12/1987 | Kosterka . |
| 4,709,813 | 12/1987 | Wildt . |
| 4,901,856 | 2/1990 | Thiele .................. 206/493 X |
| 5,000,316 | 3/1991 | Lerner .................. 206/309 |
| 5,031,772 | 7/1991 | Woodriff . |
| 5,085,318 | 2/1992 | Leverick . |
| 5,088,599 | 2/1992 | Mahler .................. 206/313 |
| 5,090,561 | 2/1992 | Spector . |
| 5,101,973 | 4/1992 | Martinez .................. 206/312 |
| 5,265,721 | 11/1993 | Cartritis .................. 206/309 |

FOREIGN PATENT DOCUMENTS

| | | | |
|---|---|---|---|
| 493983 | 7/1992 | European Pat. Off. .................. 206/210 |
| 2219573 | 12/1989 | United Kingdom .................. 206/309 |

OTHER PUBLICATIONS

Newspaper clipping from the New York Times dated Mar. 28, 1993 entitled "After the CD Long Box, It's Back to the Future".

Primary Examiner—Byron P. Gehman

[57] ABSTRACT

A compact disc package and a method of assembling the same wherein a generally rectangular envelope is formed to contain a slidable carrier sheet which is capable of holding a compact disc thereon. The carrier sheet includes a protruding tab which extends through a predefined slit in the retaining envelope to restrict movement of the carrier sheet so that the carrier sheet is only partially removable from said envelope. The novel compact disc package can be formed from a single series of rectangular sections assembled to create an envelope and a carrier sheet having movement restricted within the open area of the envelope.

42 Claims, 10 Drawing Sheets

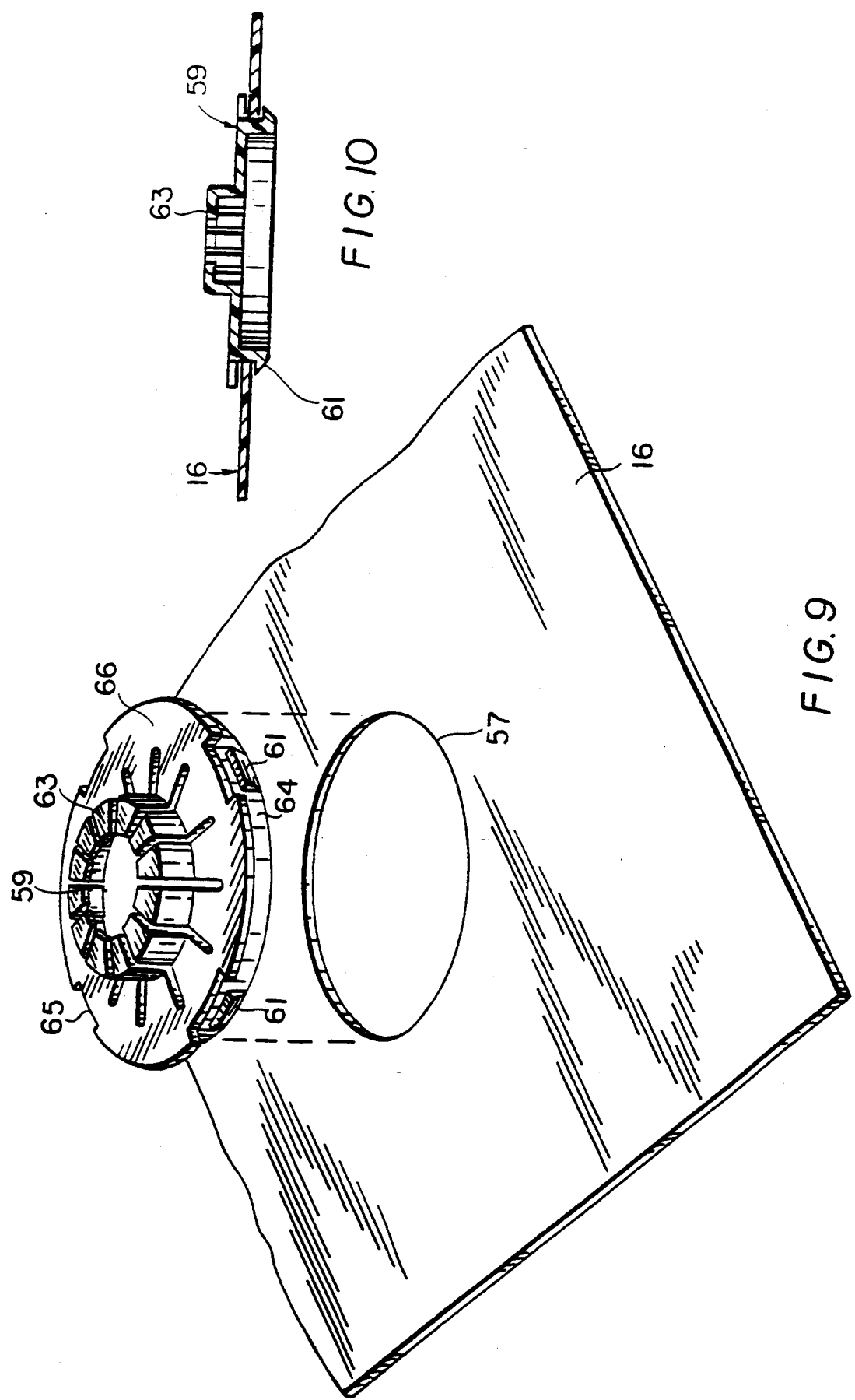

COMPACT DISC PACKAGE WITH SLIDE TAB

TECHNICAL FIELD

This invention relates to a package for a compact disc (CD) and a method of assembling the same. More particularly, it relates to the packaging of CDs in a manner which not only preserves and protects the sound quality of the CD, but also minimizes the waste and environmental pollution associated with the packaging and marketing of the CD.

BACKGROUND ART

Historically in the home audio field, vinyl records have enjoyed a dominant position as the most popular form of pre-recorded media. While 8-track tapes and magnetic cassette tapes have also enjoyed periods of popularity, all have recently begun to be replaced by CDs.

Compact discs enjoy increasingly widespread popularity today because of their high quality sound which is a result of digitally recording the audio signals. Compact discs also have the advantage of being nearly indestructible, since they are read by a laser beam which never comes in physical contact with the CD, and therefore, does not wear away the CD's surface.

While the CD as a recording medium has proven to be highly popular, the packaging of such products has not been as successful or trouble-free. Prior art packaging often resulted in an unnecessary amount of non-recyclable waste which was alarming to the environmentally-aware consumer. Moreover, the unnecessarily bulky packaging required a large area for retailers to display the CDs.

The most well known and widely used package for CDs is the so-called "jewel box" which consists of a clear plastic cover hinged on the left or right side with a CD-mounting receptacle (injection-molded) contained within the box. A major disadvantage of the jewel box is that it requires a great deal of non-recyclable plastic that is both thick and expensive. Moreover, printed graphics can only be provided by the additional step of including a separate paper insert; this additional step increases both the cost and manufacturing time.

More recently, the jewel box has begun to be replaced on the market by the compact disc package described in Kosterka U.S. Pat. No. 4,709,812 ("the '812 patent"), entitled "Compact Disc Package and a Method of Making Same," assigned to AGI Incorporated of New York, N.Y. The assignee of the '812 patent is believed to market its package under the trademark DIGIPAK®. The DIGIPAK® package is a three-part paper or cardboard item having a small circular injection-molded piece mounted in the center onto which a CD is placed. This injection-molded mounting, like the jewel box, is formed of plastics which have harmful PVC components when discarded. The mounting has finger depressions at four points (90° apart) around the circumference of the CD-receiving area in order to allow the user to remove it from the injection-molded piece after the CD has been pressed onto the standard self-locking retaining button in the center for storage purposes. The left and right leaves of the DIGIPAK® package are made of paper and contain desired text and graphics.

The DIGIPAK® package is advantageous when compared to the prior art jewel box since much less non-recyclable, injection-molded materials and plastic are implemented. However, when multiplied by the billions of CDs which have now been sold, there is still much unnecessary waste and expense associated with this type of package. The DIGIPAK® package, like the jewel box, also has the disadvantage of requiring an unnecessarily large area for retailers to display the package.

Accordingly, it is a primary object of the present invention to provide a new and improved CD package and a method of manufacturing the same.

Furthermore, it is an object of the present invention to provide a CD package which allows for an increased area for pre-printed graphics.

It is another object of the present invention to provide a CD package which requires a minimal amount of injection molded plastic.

It is still a further object of the present invention to provide a CD package which allows for reliable storage and protection of the sound quality of the music on the CD by reducing the risk of the CD falling free from its package.

Further objects and advantages of this invention will become apparent as the following description proceeds.

SUMMARY OF THE INVENTION

Briefly stated, and in accordance with one embodiment of this invention, a compact disc package for providing protective storage of a CD with minimal bulk and waste is described.

The novel CD package described herein comprises a rectangular envelope having an open first edge, a closed second edge opposite the first edge, a closed third edge joining the first and second edges, and a fourth edge having a closed portion extending from said first edge and further including a longitudinal slit bounded on one side by the closed portion extending from said first edge. A rectangular carrier sheet which is slidable within the envelope comprises a compact disc-retaining element attached to the center of the carrier sheet either by adhering it to the surface of the carrier sheet or snapping it into a hollowed region of said carrier sheet. The rectangular carrier sheet further comprises a projecting tab which extends from the carrier sheet and through the aforementioned slit.

The carrier sheet is inserted completely within its retaining envelope while transporting the CD. However, when a user desires to remove the CD for listening, the projecting tab prevents the carrier sheet from being withdrawn completely from the retaining envelope. The projecting tab rides along the slit to prevent the carrier sheet (and thus the CD) from falling out of the retaining envelope. In another embodiment of the compact disc package of the present invention, a second compact disc-retaining element can be adhered to the opposite surface of the carrier sheet so that the carrier sheet may carry two compact discs. Of course, in such a compact disc package design, the rectangular envelope must have a width sufficient to house two CDs.

For ease of manufacture, a compact disc package assembled according to the present invention preferably will comprise a single sheet of paperboard divided into three substantially equal-sized sections. For instance, a parallel series of three equal-sized sections can be utilized wherein the middle section comprises a first flap on one edge, a second U-shaped flap on an opposite edge wherein a slit is formed between the edge of the second section and the second flap, and the other two sections each sharing a remaining edge of the middle section. The section which will ultimately form a slidable sheet to hold a CD for insertion into or withdrawal from the package will share a perforated or otherwise easily detachable edge with the middle section, and will further include a projecting tab which will be slidable within the slit. The slidable sheet section will first be folded to overlie the middle section, and then the flaps will be folded over the slidable sheet. Next, the third section will be folded over and glued (or otherwise attached) to the two flaps. Finally, the slidable sheet will be detached from the middle section.

In another embodiment for manufacturing a CD package implementing a single sheet of paperboard according to the present invention, the three substantially equal-sized sections will be L-shaped, with the slidable sheet section easily detachable from the jointed common section and the third section forming a slit with the jointed section. The remaining two edges of the jointed section will have flaps attached thereto. Again, the slidable sheet section will be folded over the jointed section and the flaps will be pressed downward. Next, the third section will be folded over and glued to the two flaps. Finally, the jointed section and the slidable sheet section will be detached. The resulting CD package is slidable within an envelope formed by the jointed section and the third section, but is not completely removable due to the projecting tab from the slidable sheet section which rides within the aforementioned slit, the tab being stopped when it encounters the end of the slit towards the open side of the package.

In another embodiment, a package for containing two CDs comprises two interconnected and mirror-imaged sets of three substantially equal-sized rectangular sections whereby the first section of each of the two sets are coupled to each other along an adjoining edge. Each first section further includes a flap on an edge adjacent to their adjoining edge, whereby said flaps and said adjacent edges form slits therebetween. A second section of each set is coupled to and is easily separable from an edge of each corresponding first section opposite said adjoining edge. A third section of each of the two sets shares the remaining edge of the corresponding first section of each set. The dual compact disc package is then assembled by:

(a) adhering a compact disc retaining element to a surface of said second section of each set;
(b) providing a projecting tab on an edge of said second section of each set;
(c) folding the second section of each set to overlay its corresponding first section;
(d) bending each said flap to partially overlay its corresponding second section;
(e) folding said third section of each set to overlay its corresponding first and second sections and said flap thereby allowing said projecting tabs to protrude through said slits; and
(f) bonding said third sections of each set to its corresponding flap.

BRIEF DESCRIPTION OF THE DRAWINGS

While the specification concludes with claims particularly pointing out and distinctly claiming the subject matter regarded as the invention herein, it is believed that the present invention will be more readily understood from the following detailed description, taken in conjunction with the accompanying drawings, in which:

FIG. 9 is an exploded view of a snap-connected compact disc retaining element coupled to a cutaway portion of a removable sleeve in accordance with the present invention; and FIG. 10 is a cross-sectional view of the snap-connected compact disc retaining element coupled to a cutaway portion of a sleeve of the compact disc package.

DETAILED DESCRIPTION OF THE PREFERRED EMBODIMENT

Figure 1:
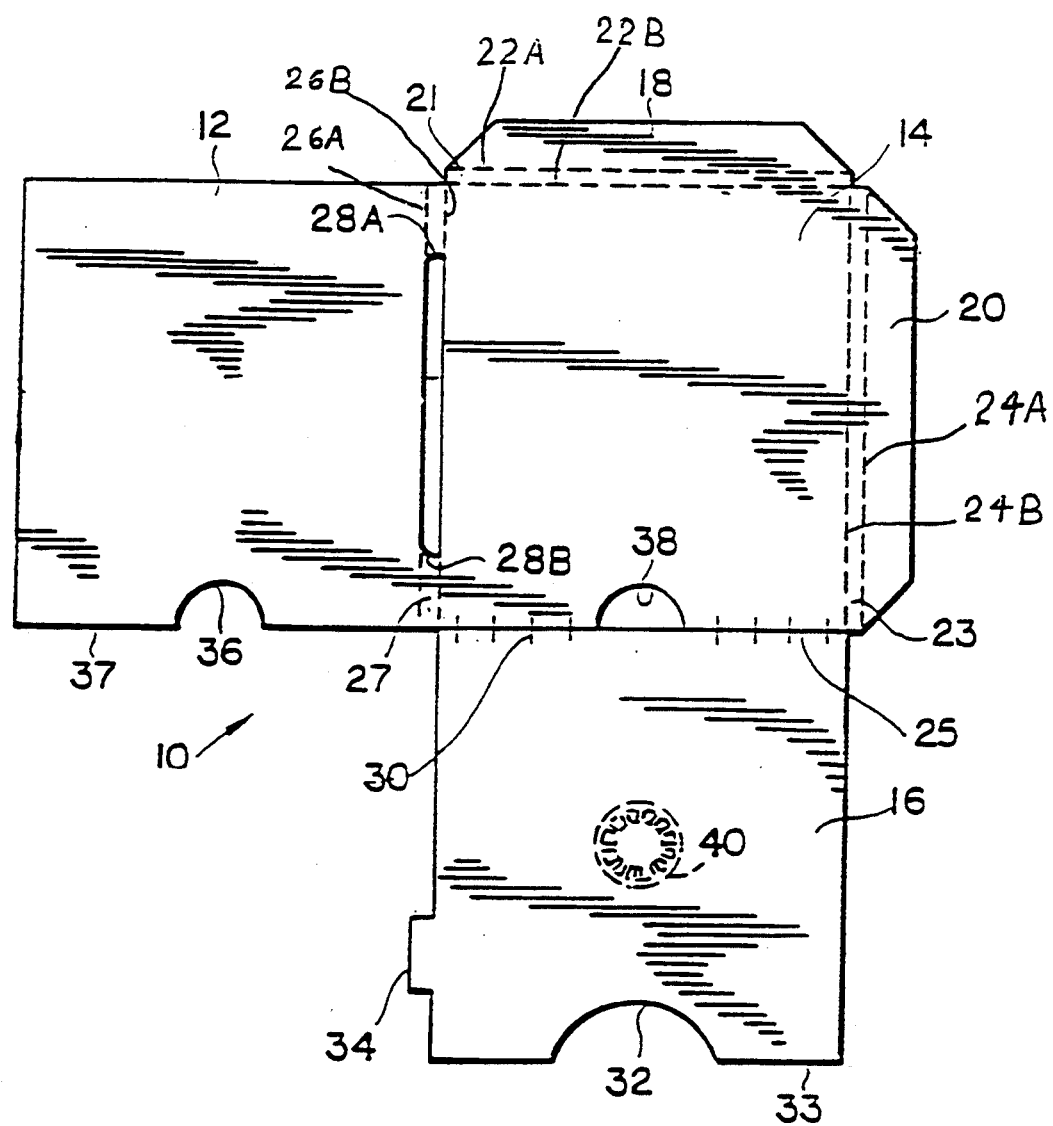
FIG. 1 is a top view illustrating a first embodiment of a compact disc package in accordance with the present invention, said package being in its unassembled form.

Referring to FIG. 1, a CD package, generally designated 10, is shown in its unassembled form. CD package 10 comprises three generally equal-sized rectangular sections 12, 14 and 16. Section 14 has a first glue flap 18 on its edge 21 and a second glue flap 20 on its edge 23. Its remaining edges 25 and 27 are coupled to section 16 and section 12 respectively. Edges 21, 23, 27 are defined by respective fold lines 22A and 22B; 24A and 24B; and 26A and 26B.

Edge 27, which is between sections 12 and 14, includes a slit 28 which does not extend completely to edge 25, but instead has endpoints 28A and 28B inward from the corresponding edges of sections 12 and 14. Edge 25, between sections 14 and 16 is a perforated or otherwise easily detachable edge as indicated in FIG. 1 by hash marks 30.

Section 16 further comprises a semi-circular cut-out region 32 on its edge 33 and a projecting tab 34 on its edge 35. Similarly, semi-circular shaped cut-outs 36 and 38 are formed near the middle of edges 37 and 25 respectively.

To assemble CD package 10, the first step is to fold section 16 along edge 25 so that section 16 overlies section 14. Next, flaps 18 and 20 are folded along edges 21 and 23 respectively to overlie a portion of section 16.

Figure 4:
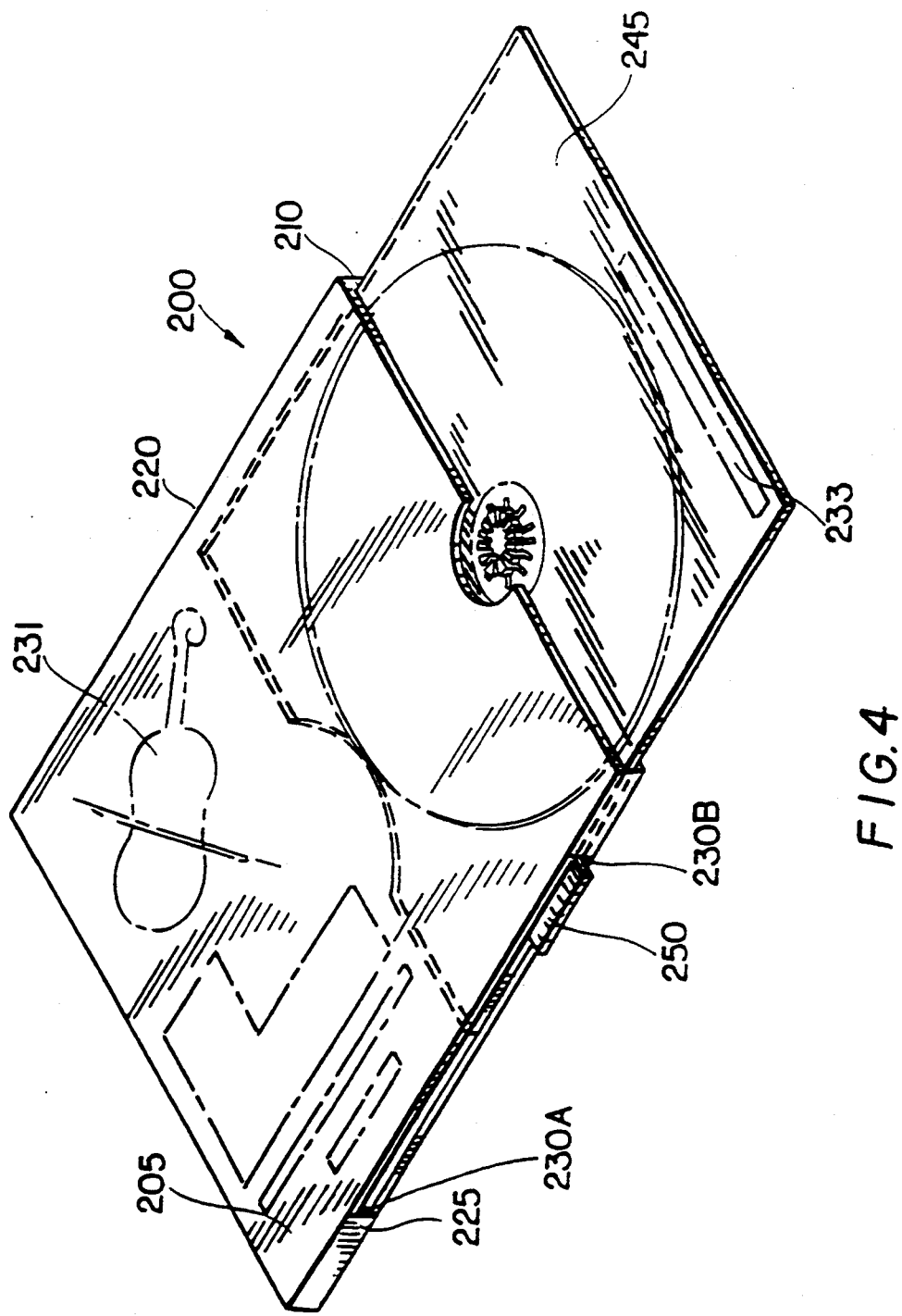
FIG. 4 is perspective view of the compact disc package illustrated in FIG. 3, wherein the CD is partially withdrawn from the protective envelope to allow removal from its package.

Flaps 18 and 20 preferably are glue flaps wherein glue is applied to their underside. Next, section 12 is folded along edge 27 and glued to flaps 18 and 20 by virtue of these flaps overlapping the corresponding adjacent edges of section 12 when it is brought into congruent contact with the "sandwich" of previously folded-over sections 14 and 16. When this step is completed, projecting tab 34 will extend through slit 28 as can be seen in FIG. 4. Finally, edge 25 is separated so that section 16 is slidable within the envelope formed by sections 12 and 14 and flaps 18 and 20. Section 16 is, however, slidable only along a distance defined by the length of slit 28 (between terminal points 28A and 28B) and is not removable from assembled package 10.

Either before or after assembly of package 10, a CD retaining element 40 is adhered to section 16 which will ultimately slide within the package. Retaining element 40 can be comprised of injection molded pliable plastic tabs which are well known in the art and described in FIGS. 7 and 7A of the '812 patent which is hereby incorporated by reference. In this case, it is preferable to attach retaining element 40 to the underside of section 16 so that when package 10 is completely assembled it allows a right-handed user to pull section 16 with the CD in an upward position.

Another technique of providing a CD retaining element is provided herein and described in FIGS. 9 and 10. Instead of gluing a CD retaining element to the flap as provided in the prior art, an appropriately sized (typically approximately one-half inch in diameter) die-cut hole 57 can be made in section 16 which is capable of receiving a disc retaining button 59 which includes a plurality of snaps 61, a plurality of upstanding pliable tabs 63, a circular region 64, and base region 66. In FIG. 9, section 16 is comprised of 18 point card stock and snaps 61 are designed to be flexible so that they fold inwardly to fit beneath section 16 and then expand to hold base region 66 to section 16. Base region 66 also has cutouts 65 to enable easier user access to snaps 61. In FIG. 10, a cross-sectional view is shown with molded button 59 placed on section 16. One advantage of implementing button 59 is that the disc retaining element can be replaced when its pliable teeth 63 loose their desired rigidity.

When the package is completely assembled (see FIGS. 3 and 4), cut-outs 36 and 38 will form finger slots which will permit a user to more easily grasp section 16 to move it (and a CD sliding with it) in and partially out of the envelope formed from sections 12 and 14 and flaps 18 and 20. The purpose of cut-out section 32 is to enable a user to grip or pinch the envelope along edge 21 while pulling carrier section 16 in and out of the envelope without restraining movement of section 16.

It should be noted by those skilled in the art that while the description herein describes the rectangular sections which comprise the novel CD package as being "substantially equal-sized" in actual practice, it may be preferable to manufacture edges 23, 27 and 35 to be six inches long and edges 21, 25 and 33 to be only, e.g., five, and one-half inches long when housing today's common CDs—this achieves the advantage of simplifying placement of the CDs in their displays. Of course, the actual dimensions utilized will depend on the designer's choice and manufacturing requirements.

Figure 2:
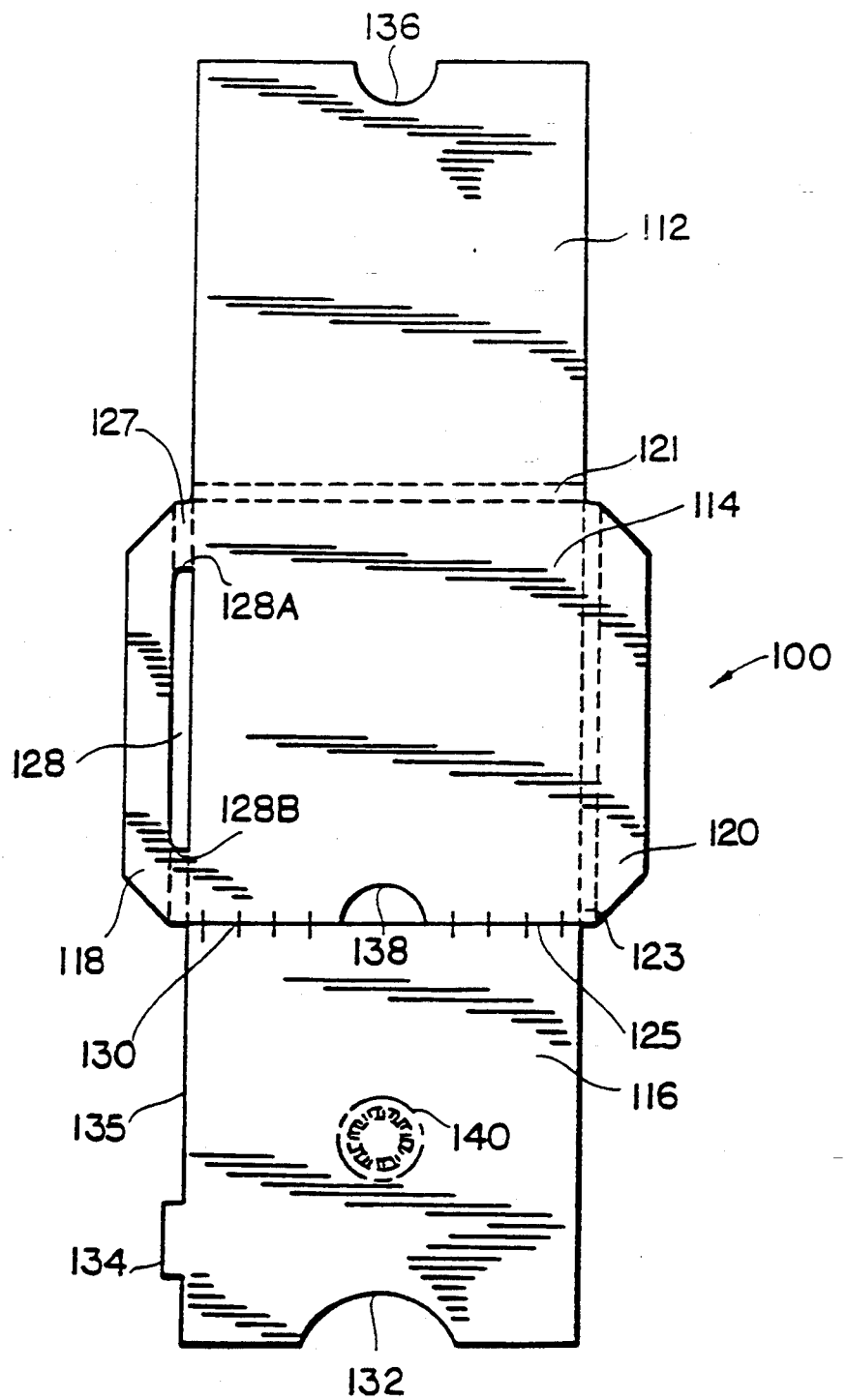
FIG. 2 is a top view illustrating a second embodiment of a compact disc package in accordance with the present invention, said package being in its unassembled form.

Referring now to FIG. 2, a second embodiment of an unassembled CD package in "layout" form is illustrated. CD package 100 comprises a parallel series of sections 112, 114 and 116. Section 114 comprises a first flap 120 along its edge 123, a second flap 118 along its edge 127 forming a slit 128 therebetween which extends from endpoint 128A to endpoint 128B, a third edge 121 in common with section 112 and a fourth edge 125 in common with section 116. Sections 114 and 116 are easily detachable when separated along perforations 130.

To assemble CD package 100, section 116, which includes a projecting tab 134 on its edge 135, is folded along edge 125 to overlie section 114. Flaps 118 and 120 are then folded along edges 127 and 123 respectively to overlie section 116. Next, section 112 is then folded along edge 121 and is adhered by gluing means to previously underlying surfaces of flaps 118 and 120. Finally, sections 114 and 116 are separated so that section 116 is slidable within an envelope formed from sections 112 and 114, and flaps 118 and 120, whereby the longitudinal movement of section 116 is limited to the length of slit 128 from endpoint 128A to endpoint 128B based on the protruding nature of tab 134 through slit 128. Thus when section 116 slides out of the envelope created by sections 112 and 114 and flaps 118 and 120, it is prevented from completely falling from the retaining envelope based on protruding tab 134 hitting endpoint 128B. Again, optional cut-outs 136 and 138 and cut-out section 132 are incorporated to enhance the functionality of CD package 100. The retaining element 140 is illustrated on the center of the surface of section 116. Retaining element 140 can be affixed by conventional techniques or by the manner described in FIGS. 9 and 10.

It should be noted that CD retaining elements could be placed on opposite surfaces of section 116 to enable storage of two compact discs. In such instances, flaps 118 and 120 should have a thickness sufficient to produce a wide enough opening between sections 112 and 114 to house two compact discs.

Figure 3A:
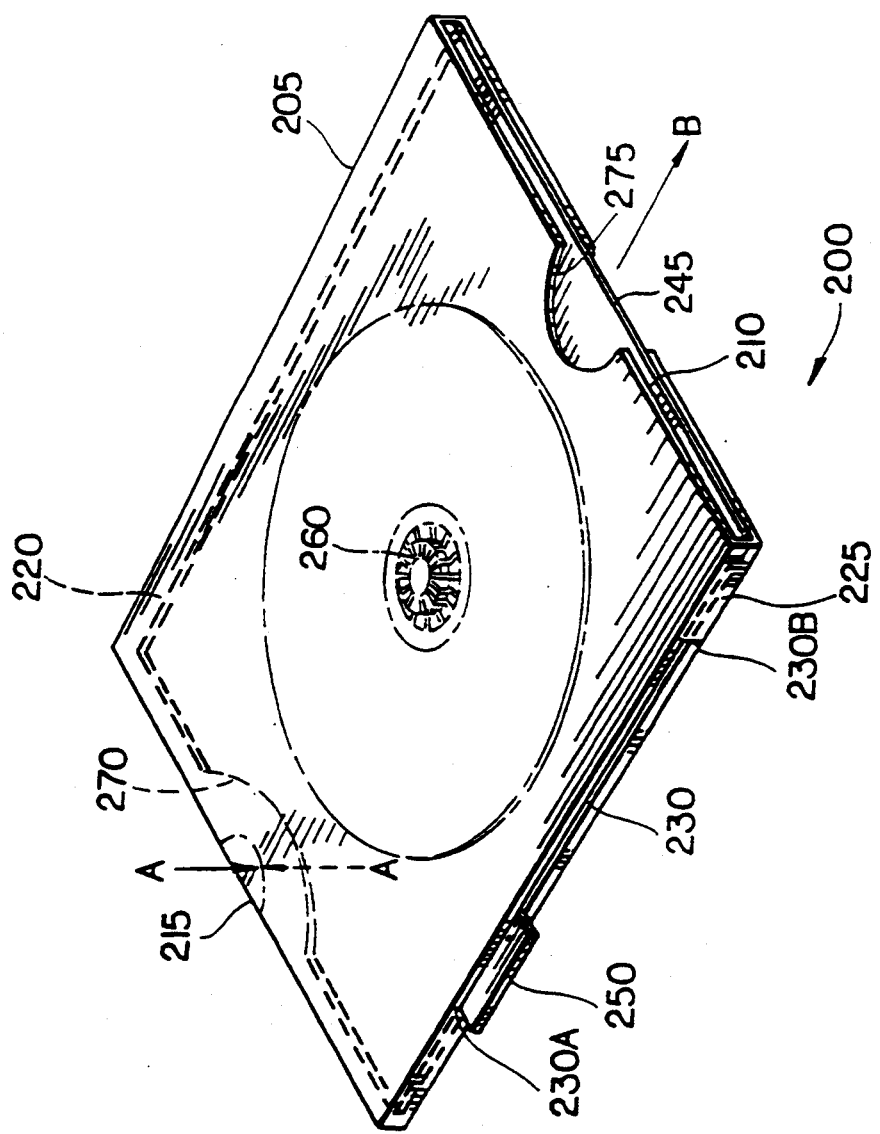
FIG. 3A is a perspective view of a compact disc package made in accordance with the present invention, wherein a CD is completely encased in a protective envelope as indicated in shadow.

Referring now to FIG. 3A, a CD package 200 is shown in a transparent form in order to illustrate the placement of CD 255 in package 200. CD package 200 comprises an envelope 205 having an open edge 210, an opposite closed edge 215 (not fully visible in FIG. 3A), a closed edge 220 (also not completely visible in FIG. 3A), and an edge 225 which includes a defined slit 230 which does not extend along the entire length between edges 210 and 215 but instead extends from endpoint 230A to endpoint 230B. A carrier sheet 245 is shaped to be slidable within the opening area of envelope 200 along the distance defined by the length of slit 230. A projecting tab 250 is shown in FIG. 3A as being an integral part of carrier sheet 245, and protrudes from slit 230. In its completely encased position as shown in FIG. 3A, tab 250 protrudes from slit 230 on a side closest to edge 215. Preferably, the closed portion of edge 225 nearest edge 215 will extend so as to stop movement of carrier sheet 245 (by interfering with protruding tab 250) before carrier sheet 245 exerts any pressure against edge 215. This helps prevent the possibility of carrier sheet 245 weakening closed edge 215. A CD 255 is shown in phantom within envelope 200 and attached to carrier sheet 245 by means of a retaining element 260.

In order to remove carrier sheet 245 (and thus CD 255) from its protective envelope 205, a right-handed user will typically pinch down on envelope 205 near the center of edge 215 as illustrated by oppositely directed arrows A—A, and will pull carrier sheet 245 near edge 210 in direction B. A cut-out region 270 is formed on carrier sheet 245 so that when edge 215 is pinched it will not restrict movement of carrier element 245. Moreover, cut-out 275 is formed on envelope 205 on both its top and bottom surfaces to facilitate access to carrier sheet 245 to exert force B to remove the CD from envelope 205.

Figure 3B:
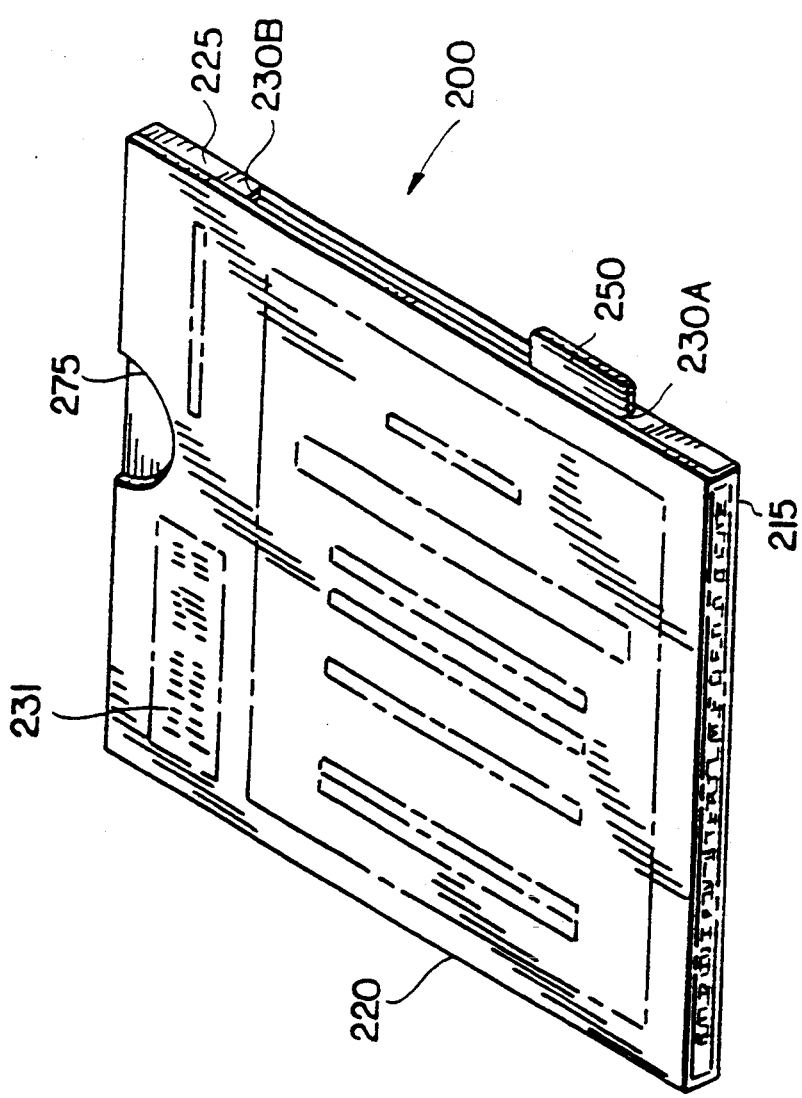
FIG. 3B is a perspective view of a compact disc package wherein a CD is completely encased in a protective envelope with graphics on its outer surface.

Referring to FIG. 3B, a non-transparent view of package 200 is illustrated. It should be noted that various graphical information can be provided on the top surface of package 200 and also on closed edge 215. The information provided along edge 215 is typically the catalog number, the album title, and the artist. This allows the user to store package 200 in standard CD carrying cases and still read the title information.

Turning now to FIG. 4, which shows the CD in the "withdrawn" mode, package 200 is illustrated with carrier sheet 245 fully extended from envelope 205 for removing CD 255 (endpoint 230B). Carrier sheet 245 remains partially within envelope 205 due to the restriction caused by projecting tab 250 coming in contact with a closed portion of edge 225. This design greatly reduces the possibility of the CD 255 from falling from envelope 205, particularly when CD 255 is not properly engaged on retaining element 260. In its fully extendable position of FIG. 4, CD record 255 can be lifted off retaining element 200 to be played by a user. This is done by gently disengaging the record from retaining element 260. When its use is completed, the CD can easily be snapped back on retaining element 260 and pushed back into envelope 205 as shown in FIG. 3A. Graphical information 231 is placed on envelope 205 and additional graphical information 233 can be placed on carrier sheet 245. In FIG. 4, the CD package 200 is easily utilized by a right-handed user by grasping carrier sheet 245 with the user's right hand. However, unlike what is illustrated in FIG. 4, it is often preferable to have tab 250 extend from the top of CD package 200 to allow placement on a shelf along the bottom edge 225 without risking damage to tab 245. FIG. 4 demonstrates the tab along bottom edge 225 instead of edge 220 in order to more clearly illustrate the novel tab and slit design.

Figure 5:
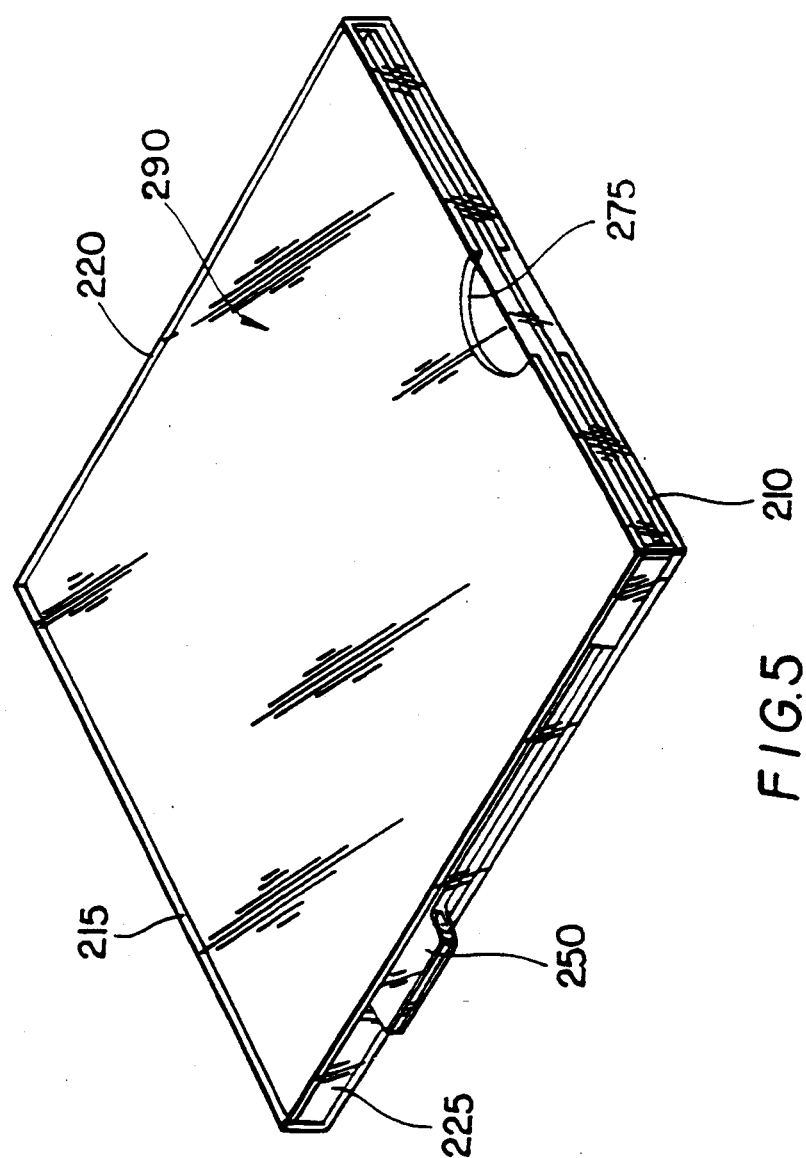
FIG. 5 is a perspective view of the compact disc package illustrated in FIG. 3, with a protective layer of material around said package for marketing purposes.

Referring now to FIG. 5, the CD package 200 shown in FIG. 3 is shown in its ultimate commercial form, encased in a plastic protective layer 290. Layer 300 may be comprised of shrink-wrapped plastic and is provided to protect the packaging prior to sale, minimize the risk of theft of the CD from the packaging, and to place promotional labels or stickers (such as those advertising price) which can be removed when the CD is purchased and brought to the user's home. A bar code or electronic device can be attached to layer 290 to prevent theft by setting off an alarm if the device is removed from a store. By attaching the bar code or electronic device to the protective layer 290 the printing on the package is protected.

It should be apparent to one skilled in the art that while CD package 200 can be assembled by the methods described in FIGS. 1 and 2, it is also possible to use a discrete envelope and carrier sheet wherein projecting tab 250 is simply attached to an edge of carrier sheet 245 after its insertion into envelope 205. Furthermore, for purposes of merchandising the CD, package 200 preferably will include a shrink-wrapped protective plastic layer to both further protect the CD and its package, and to prevent theft.

An advantage of CD package 200 is that graphics can be pre-printed on both the outer envelope 205 and carrier sheet 245. This enables a record manufacturer to include necessary information such as "liner" notes, photographs, copyright notices and decorative effects (such as musical group of production company logos) without the need for providing a separate insert.

Figure 6:
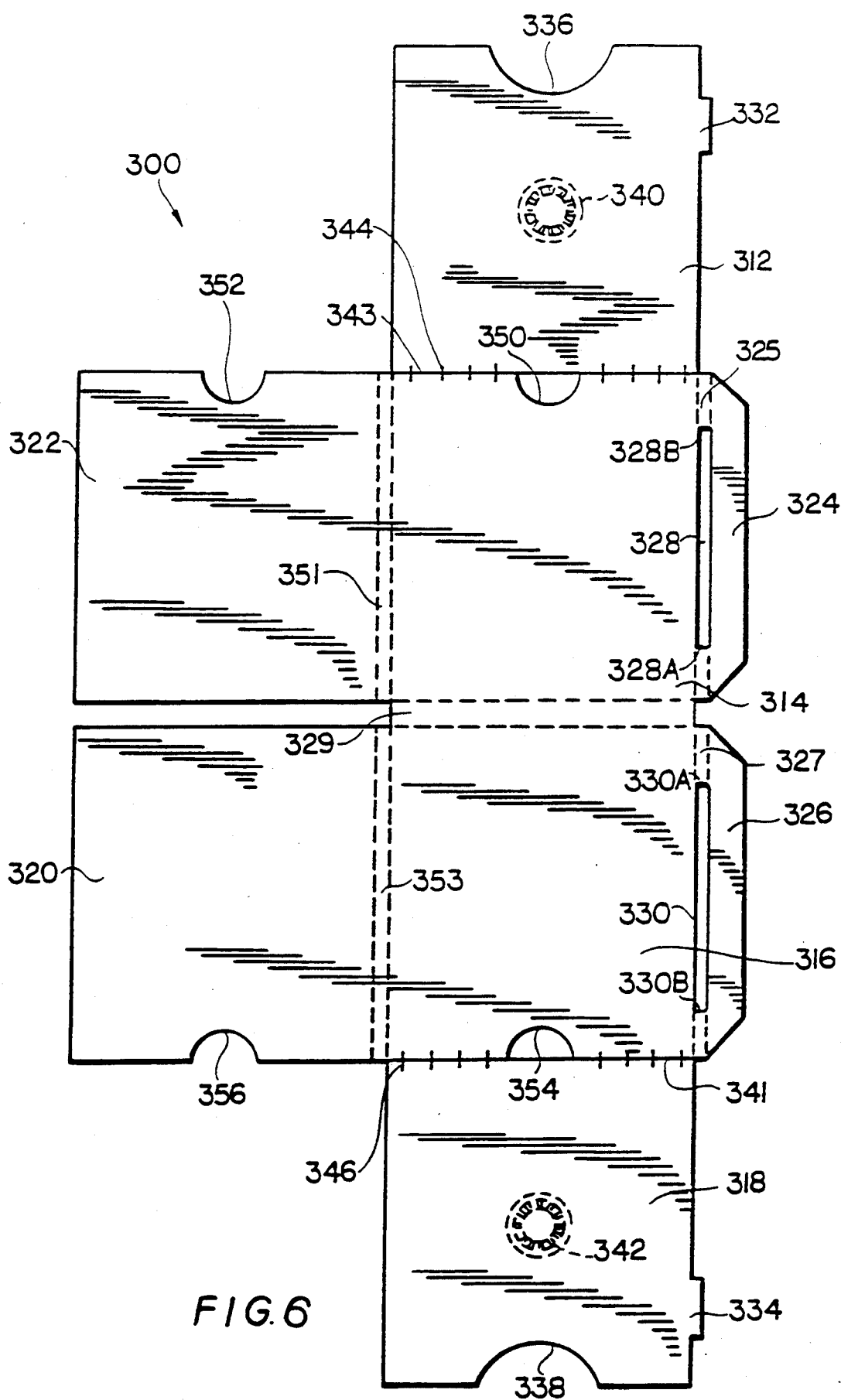
FIG. 6 is a top view of a compact disc package capable of holding two CDs in accordance with the present invention, said package being in its unassembled form.
Figure 7:
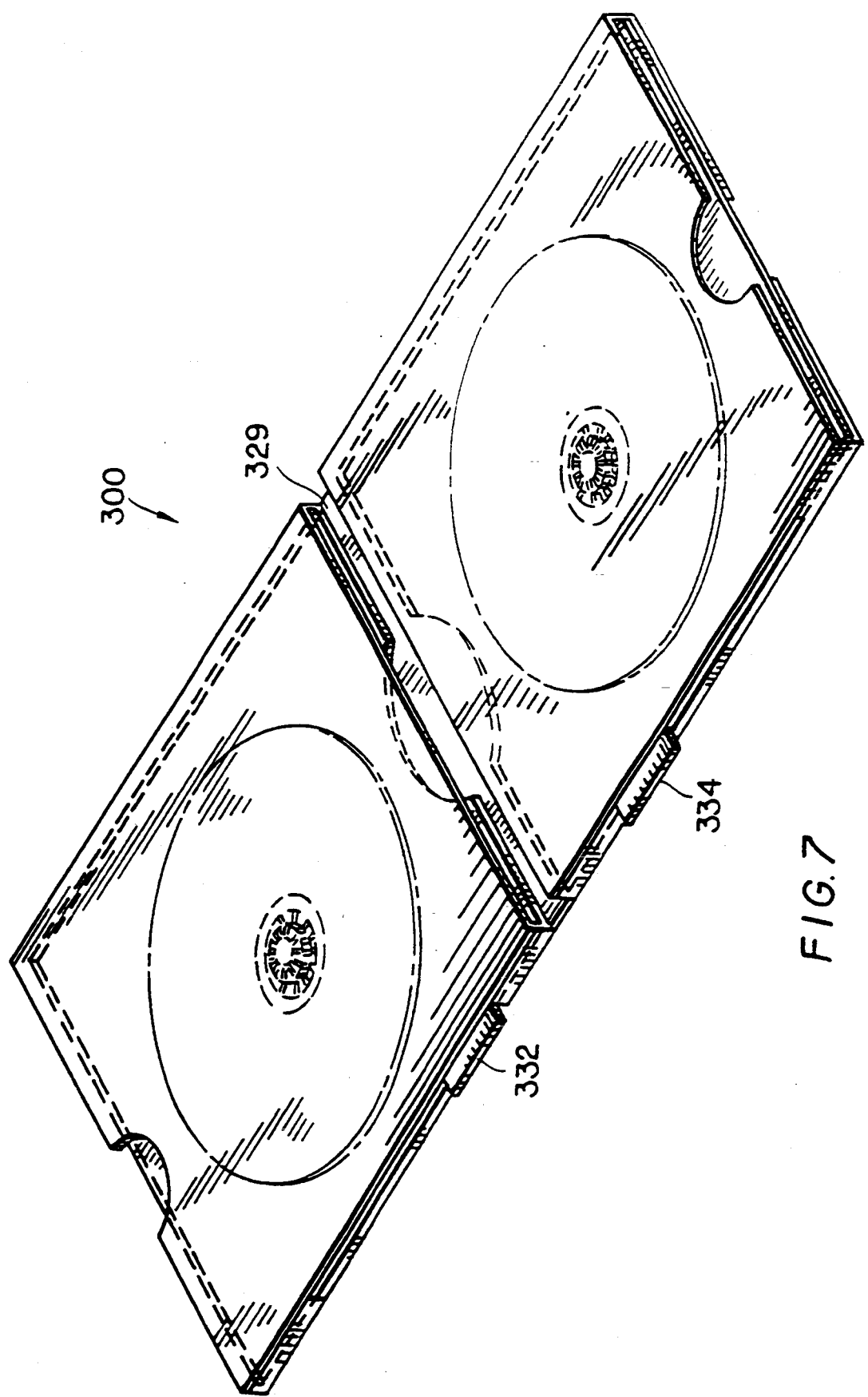
FIG. 7 is a perspective view of the compact disc package illustrated in FIG. 6, wherein both CDs are completely encased in protective envelopes with the compact disc package opened.
Figure 8:
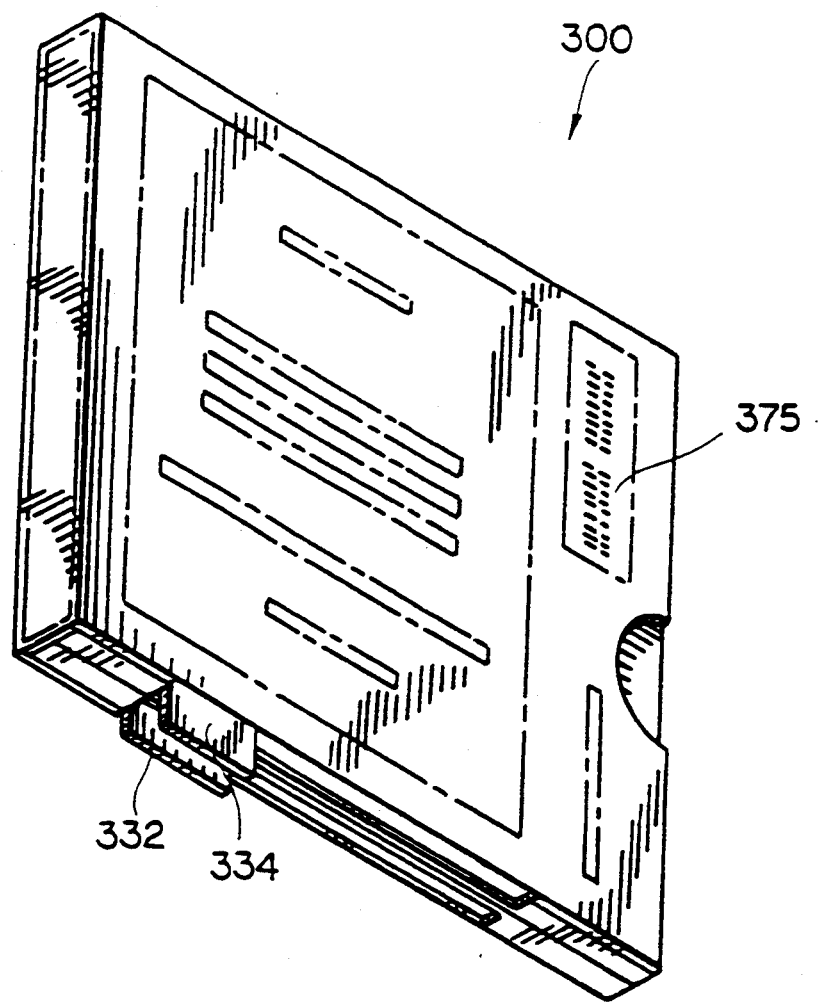
FIG. 8 is a perspective view of the compact disc package illustrated in FIG. 6, wherein both CDs are completely encased in protective envelopes with the compact disc package closed.

FIGS. 6-8 disclose a compact disc package 300 in unassembled (FIG. 6) and assembled (FIGS. 7-8) forms. Compact disc package 300 is comprised of six generally equal-sized rectangular sections 312,314,316,318,320 and 322. Section 314 has a glue flap 324 on its edge 325 and section 316 has a glue flap 326 on its edge 327.

Edge 325 includes a slit 328 therebetween which extends from end point 328A to end point 328B. Similarly, edge 327 includes a slit 330 therebetween which extends from end point 330A to end point 330B. Sections 312 and 318 each include respective tabs 332 and 334, cutouts 336 and 338, and retaining elements 340 and 342. Section 316 shares edge 341 with section 318 and is easily detachable as indicated by hatched lines 346. Similarly, section 312 shares edge 343 with section 314 and is easily detachable as illustrated by hatched lines 344. Sections 314 and 322 share an edge 351 and have respective cutouts 350 and 352. Sections 316 and 320 share an edge 353 and have respective cutouts 354 and 356.

Compact disc package 300 can also be viewed as two mirror-imaged sets of three substantially equal-sized rectangular sections when divided along a line extending from edge 329. When viewed in this light, the steps taken on the "top" half of FIG. 6 is corresponding performed to the "bottom" half of FIG. 6.

To assemble CD package 300, section 318 is folded along edge 351 to overlie section 316 and section 312 is folded along edge 343 to overlie section 314. Flap 324 is then folded along edge 325 to overlie section 312 while, correspondingly, flap 326 is folded along edge 327 to overlie section 318. Next, section 322 is folded along edge 351 and is adhered to flap 324 by gluing means. Correspondingly, section 320 is folded along edge 353 to overlie flap 326 and is glued thereto. Finally, edges 341 and 343 are separated so that sections 312 and 318 are slidable within a region defined by end points 328A to 328B and 330A and 330B respectively. As a result, CD package 300 can carry two CDs, one on retaining element 340 and one on retaining element 342 and is foldable along an edge 329.

FIG. 7 illustrates dual CD package 300 with edge 329 in its open position. FIG. 8 illustrates dual CD package 300 with edge 329 in its closed position. It should be noted that in FIG. 8, as seen in previous embodiments, graphical information may be presented on the outside of dual CD package 300.

From the foregoing description, it will be apparent that the present invention provides a CD package and assembly of the same which is inexpensive and greatly reduces both waste and space requirements. Moreover, it will be further apparent that the invention provides a CD package and a method of manufacturing the same wherein there is sufficient space for required or desired pre-printed information.

Various modifications of the invention will occur to those skilled in the art. For example, finger slots may be cut out on the carrier sheet to permit easier access to the CD when removing the CD from its retaining element.

While there have been shown and described what are presently considered to be the preferred embodiments of this invention, it would be obvious to those skilled in the art that various other changes and modifications may be made without departing from the broader aspects of this invention. It is, therefore, desired that the appended claims cover all such changes and modifications as fall within the true spirit and scope of this invention.

What is claimed is:

1. A compact disc package for use with a compact disc comprising:
   an envelope having an open first edge for ingress and egress of a compact disc, a closed second edge opposite said first edge, a closed third edge joining said first and second edges, and a fourth edge having a closed portion extending from said first edge and an opening bounded on one side by said closed portion;
   said first edge defining a cut out portion along at least a portion thereof; and
   a carrier sheet slidable within said envelope between a first open position where a compact disc held on the carrier sheet extends through said open first edge and is at least partially outside of said envelope and a second closed position where a compact disc held on the carrier sheet is within said envelope, said carrier sheet comprising a first compact disc retaining element adhered to said carrier sheet and a projecting tab extending from an edge of said carrier sheet and through said opening to prevent the carrier sheet from being completely removed from said envelope, said carrier sheet extending into the cut out portion of said open first edge when said carrier sheet is in said second position, so that a user can access the carrier sheet and slide it to said first position.

2. The compact disc package of claim 1 wherein said carrier sheet consists of a flexible material.

3. The compact disc package of claim 2 wherein said carrier sheet consists of paperboard.

4. The compact disc package of claim 3 wherein said envelope consists of a flexible material.

5. The compact disc package of claim 4 wherein said envelope consists of paperboard.

6. The compact disc package of claim 5 wherein said retaining element consists of plastic.

7. The compact disc package of claim 6 wherein said sheet is pre-printed on one or more surfaces.

8. The compact disc package of claim 7 wherein said envelope is pre-printed on one or more surfaces.

9. The compact disc package of claim 1 wherein said cut-out is semi-circular in shape.

10. The compact disc package of claim 9 wherein said carrier sheet comprises a shaped cut-out region on an edge of said carrier sheet opposite said open first edge of said envelope.

11. The compact disc package of claim 10 wherein said envelope and said carrier sheet are rectangularly shaped.

12. The compact disc package of claim 11 further comprising a shrink-wrapped protective layer around said package.

13. The compact disc package of claim 12 further comprising a second compact disc retaining element adhered to said carrier sheet on an opposite surface from said first retaining element.

14. A compact disc package for use with a compact disc, comprising:
   a substantially rectangular sleeve having a top surface and a bottom surface, a first sidewall along a first edge, a second sidewall along a second edge and a third sidewall along a third edge, each sidewall being substantially perpendicular to the top surface and bottom surface and connecting the top surface and bottom surface, a fourth edge of said sleeve being open, to allow ingress and egress of a said compact disc therethrough, and said first and third edges being disposed adjacent to said fourth edge, and said second edge being disposed opposite to said fourth edge;
   a carrier sheet extending along a plane and slideable within said sleeve between a first position where a compact disc held on the carrier sheet is within said sleeve and a second position where a compact disc held on the carrier sheet is at least partially outside of said sleeve, said carrier sheet comprising a compact disc retaining element adhered to said carrier sheet, and a projecting tab extending from a first edge of said carrier sheet along the same plane as the carrier sheet; and
   one of said first sidewall and said second sidewall defining a slit extending along a portion thereof for receiving said tab therethrough, and defining a stop point, such that said carrier sheet is slideable only as far as said stop point.

15. The compact disc package of claim 14 wherein said carrier sheet consists of flexible material.

16. The compact disc of claim 15 wherein said sleeve consists of paperboard.

17. The compact disc package of claim 16 wherein said envelope consists of flexible material.

18. The compact disc package of claim 17 wherein said carrier sheet consists of paperboard.

19. The compact disc package of claim 18 wherein said retaining element consists of injection molded plastic.

20. The compact disc package of claim 19 wherein said sleeve is pre-printed on one or more surfaces.

21. The compact disc package of claim 20 wherein said carrier sheet is pre-printed on one or more surfaces.

22. The compact disc of claim 21 wherein said open edge includes a cut-out to facilitate handling of said carrier sheet.

23. The compact disc package of claim 22 wherein said cut-out is semi-circular in shape.

24. The compact disc package of claim 23 wherein said carrier sheet comprises a shaped cut-out region on a second edge of said carrier sheet opposite said open edge of said sleeve.

25. The compact disc package of claim 24 wherein said sleeve and said carrier sheet are rectangularly shaped.

26. The compact disc package of claim 25 further comprising a shrink-wrapped protective layer around said package.

27. The compact disc package of claim 26 further comprising a second retaining element adhered to said carrier sheet on an opposite surface from said first retaining element.

28. A method of assembling a compact disc package from a generally rectangular sheet divided into a first section, a second section and a third section, said first section having a first edge in common with an edge of said second section thereby forming a fold line, an opposite second edge in common with and easily separable from an edge of said third section, a third edge having a first foldable flap, and a fourth edge having a second foldable flap, said second foldable flap and said fourth edge defining a slit therebetween, and said method comprising the steps of:

(a) adhering a compact disc retaining element to an underlying surface of said third section;

(b) providing a projecting tab on an edge of said third section;

(c) folding said third section so that said third section overlays said first section;

(d) bending said first and second flaps so that said flaps partially overlap said third section and said projecting tab protrudes from said slit;

(e) folding said second section along said fold line so that it overlays said first and second sections and said first and second flaps; and (f) bonding said second section to said first and second flaps.

29. The method of claim 28 further comprising the additional step of:

separating said first and third sections along their common edge whereby said third section is slidable between said first and second sections.

30. The method of claim 29 further comprising the further step of:

mounting a compact disc on said retaining element; and shrink-wrapping a protective layer around said package.

31. A method of assembling a compact disc package from a first section, a second section and a third section, all three sections being interconnected, and of substantially equal size, said first section having a first flap on a first edge, a second flap on an adjacent second edge, an edge of said second section in common with and easily separable from a third edge, and an edge of said third section in common with a fourth edge, said first and third sections thereby defining a slit therebetween, and said method comprising the steps of:

(a) adhering a compact disc retaining element to a surface of said second section;

(b) providing a projecting tab on an edge of said second section;

(c) folding said second section to overlay said first section;

(d) bending said first and second flaps to partially overlay said second section.

(e) folding said third section to overlay said first and second sections and said first and second flaps to allow said projecting tab to protrude through said slit; and (f) bonding said third section to said first and second flaps.

32. The method of claim 31 comprising the additional step of:

separating said first and second sections along their common edge whereby said second section is slidable between said first and third sections.

33. The method of assembling a compact disc package for two CDs comprising two interconnected and mirror imaged sets of a first section, a second section and a third section of substantially equal size, said first section of each set coupled to each other by an adjoining edge and each having a flap on an adjacent edge to said adjoining edge, said flaps and adjacent edges forming slits therebetween, second sections of each set coupled to and easily separable from an edge of each corresponding first section opposite said adjoining edge, and a third section of each set in common with the remaining edge of the first section of each set, whereby said method comprises the steps of:

(a) adhering a compact disc retaining element to a surface of said second section of each set;

(b) providing a projecting tab on an edge of said second section of each set;

(c) folding the second section of each set to overlay its corresponding first section;

(d) bending each said flap to partially overlay its corresponding second section;

(e) folding said third section of each set to overlay its corresponding first and second sections and said flap thereby allowing said projecting tabs to protrude through said slits; and (f) bonding said third section of each set to its corresponding flap.

34. The method of claim 33 comprising the additional step of:

separating said first and second sections of each set along their common edges whereby said second section of each set is slidable between its corresponding first and third sections.

35. A retaining element for a compact disc having a hollowed circular area at its center comprising:

(a) a generally circular base region;

(b) a circular plurality of upstanding pliable tabs having a circumference suitable to secure a CD in position by frictional engagement with the inner circumference of said CD defined by its hollow circular area;

(c) a circular region extending downwardly from and slightly smaller than said base region; and (d) a plurality of flexible snaps extending outward from said circular region, said snaps being compressible to fit beneath a cutout surface whereby the base region would be secured to said surface.

36. The retaining element of claim 35 wherein said base-region has cutaway portions to enable easy access to said flexible snaps.

37. A blank for forming a compact disc package, comprising:

a first section having first section first, second, third and fourth sides and first section first, second and third edge members depending from and foldable along said first section first, second and third sides respectively of said inner member;

a second section having second section first, second, third and fourth sides and having substantially the same dimensions as said first section;

wherein said first and second sections will define an envelope for receiving a compact disc when folded, said envelope having a periphery; and a third section having third section first, second, third and fourth sides and being no greater in size than said first section;

wherein said first and third edge members are disposed opposite each other with respect to said first section and one of said first and third edge members includes a slot extending therealong;

wherein said third section first and third sides are disposed opposite each other and at least one of said third section first and third sides includes a tab element protruding therefrom;

wherein one of said second section sides and one of said first section edge member have a common edge defining a fold line therealong;

wherein one of said third section sides and a portion of said periphery have a common edge defining a fold line therealong.

38. The blank of claim 37, wherein said first section fourth side and one of said third section sides have a common edge defining a fold line therealong.

39. The blank of claim 38 wherein said first section fourth side and said one third section side is perforated at said fold line.

40. The blank of claim 37 wherein said third section is sized to receive a said compact disc thereon.

41. The blank of claim 40 further including a compact disc retaining element coupled to said third section.

42. The blank of claim 37 wherein said blank is formed of paperboard.

* * * * *

UNITED STATES PATENT AND TRADEMARK OFFICE
CERTIFICATE OF CORRECTION

PATENT NO. : 5,450,953
DATED : September 19, 1995
INVENTOR(S) : James Reisman

It is certified that error appears in the above-indentified patent and that said Letters Patent is hereby corrected as shown below:

Title page, item [76]
    Inventor: Steven Z. Kraus

Signed and Sealed this

Nineteenth Day of December, 1995

*Attest:*

BRUCE LEHMAN

*Attesting Officer*      *Commissioner of Patents and Trademarks*